United States Patent
Aoki

(10) Patent No.: US 8,611,772 B2
(45) Date of Patent: Dec. 17, 2013

(54) RECORDING MEDIUM IMAGING APPARATUS FOR DETERMINING A TYPE OF A RECORDING MEDIUM BASED ON A SURFACE IMAGE OF A REFERENCE PLATE AND A SURFACE IMAGE OF THE RECORDING MEDIUM

(75) Inventor: Masaru Aoki, Numazu (JP)

(73) Assignee: Canon Kabushiki Kaisha, Tokyo (JP)

( * ) Notice: Subject to any disclaimer, the term of this patent is extended or adjusted under 35 U.S.C. 154(b) by 439 days.

(21) Appl. No.: 12/896,483

(22) Filed: Oct. 1, 2010

(65) Prior Publication Data
US 2011/0080571 A1 Apr. 7, 2011

(30) Foreign Application Priority Data
Oct. 6, 2009 (JP) .................................. 2009-232726

(51) Int. Cl.
*G03G 15/00* (2006.01)
(52) U.S. Cl.
USPC ............................................ 399/45; 399/389
(58) Field of Classification Search
USPC .............................................. 399/45, 49, 389
See application file for complete search history.

(56) References Cited

U.S. PATENT DOCUMENTS

| 6,668,144 | B2 | 12/2003 | Maruyama |
| 6,801,727 | B2 * | 10/2004 | Maruyama et al. ............. 399/45 |
| 7,095,968 | B2 * | 8/2006 | Akita et al. ..................... 399/45 |
| 7,130,573 | B2 * | 10/2006 | Nakamori ..................... 399/389 |
| 7,149,441 | B2 * | 12/2006 | Akita et al. ..................... 399/45 |
| 7,558,492 | B2 * | 7/2009 | Aoki ........................ 399/389 X |
| 2008/0175606 | A1 * | 7/2008 | Okada ............................. 399/15 |
| 2008/0252909 | A1 | 10/2008 | Honguh et al. |

FOREIGN PATENT DOCUMENTS

| JP | 10-009841 A | 1/1998 |
| JP | 2001-099632 A | 4/2001 |
| JP | 2002-182518 A | 6/2002 |
| JP | 2003-091110 A | 3/2003 |
| JP | 2008-266015 A | 11/2008 |

* cited by examiner

*Primary Examiner* — Sandra Brase
(74) *Attorney, Agent, or Firm* — Canon USA Inc. IP Division

(57) ABSTRACT

A recording medium imaging apparatus includes an irradiation unit configured to irradiate a recording medium with light, an imaging unit configured to capture reflected light which is irradiated by the irradiation unit and reflected by the recording medium as a surface image, and a reference plate which includes a background that reflects light irradiated by the irradiation unit, and a mark that has a different reflectance ratio to the background, wherein the imaging unit captures reflected light reflected by the reference plate as a surface image and includes a control unit that determines a type of the recording medium based on the surface image of the reference plate and the surface image of the recording medium.

10 Claims, 12 Drawing Sheets

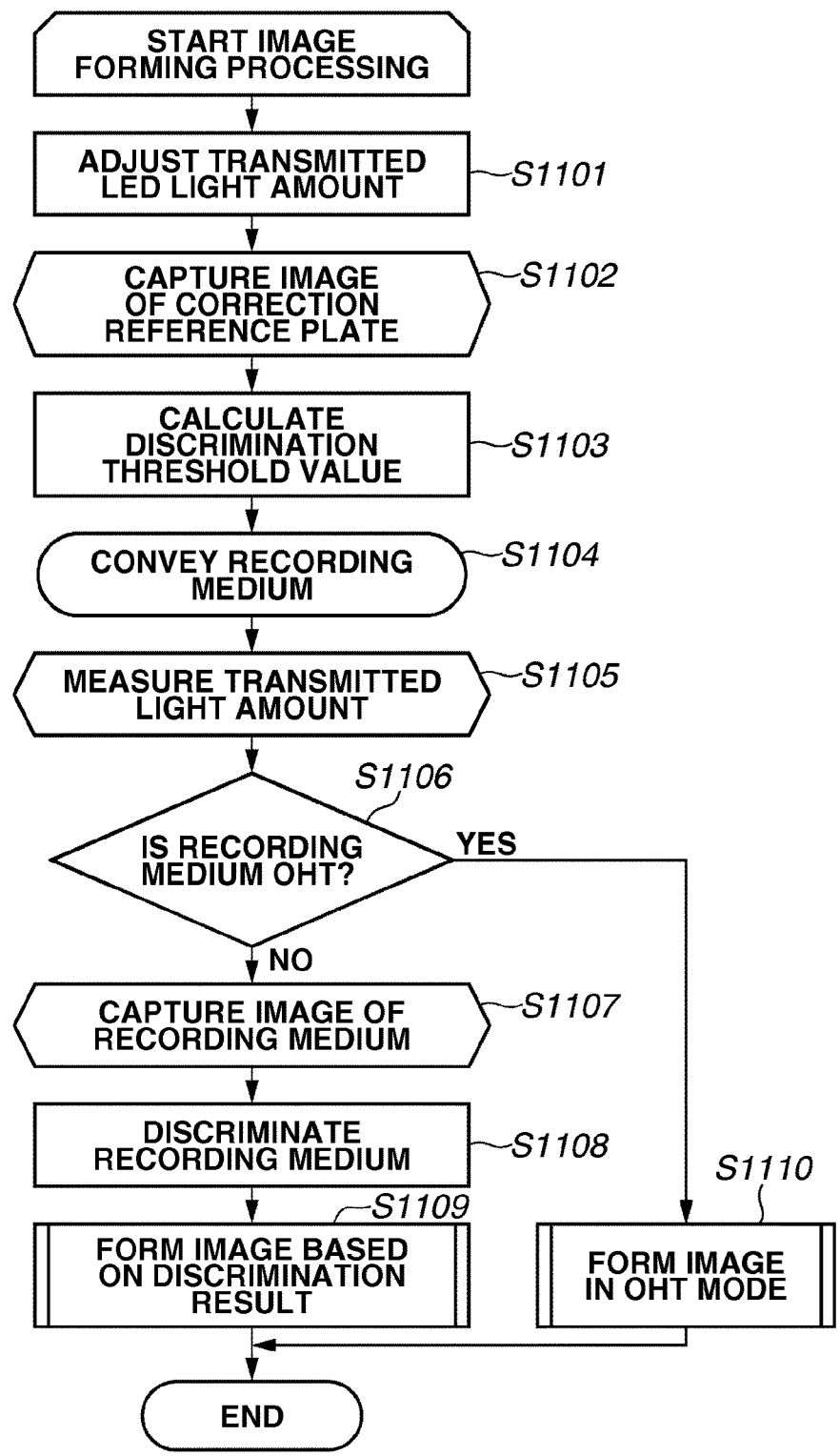

RECORDING MEDIUM IMAGING APPARATUS FOR DETERMINING A TYPE OF A RECORDING MEDIUM BASED ON A SURFACE IMAGE OF A REFERENCE PLATE AND A SURFACE IMAGE OF THE RECORDING MEDIUM

BACKGROUND OF THE INVENTION

1. Field of the Invention

The present invention relates to a recording medium imaging apparatus that detects a type of the recording medium, and to an image forming apparatus that controls an image forming condition according to a type of the recording medium.

2. Description of the Related Art

In a conventional image forming apparatus, a size and a type (rough paper, plain paper, glossy paper, or the like) of a recording medium are set by a user from an operation panel or the like provided in a main body of the image forming apparatus. Image forming conditions including developing conditions, transfer conditions, fixing conditions, and the like are suitably controlled according to that setting.

To reduce such a operational load for settings executed by a user, Japanese Patent Application Laid-Open No. 2002-182518 discusses a method in which a surface image of a recording medium is captured using a complementary metal oxide semiconductor (CMOS) sensor and a type of the recording medium is detected from the captured surface image.

However, a conventional method for detecting a recording medium performs control to suppress an influence of performance of the sensor, an error in sensor assembly, or the like to capture a highly accurate surface image. In other words, a reference sheet is used to capture a surface image and a threshold value is set to discriminate the recording medium in respective image forming apparatuses during factory shipment or the like, and therefore effort and costs are required.

SUMMARY OF THE INVENTION

The present invention is directed to reducing efforts and costs associated with control operations to suppress errors in sensor performance or during sensor assembly.

A recording medium imaging apparatus includes an irradiation unit configured to irradiate a recording medium with light, an imaging unit configured to capture reflected light which is irradiated by the irradiation unit and reflected by the recording medium as a surface image, and a reference plate which includes a background that reflects light irradiated by the irradiation unit, and a mark that has a different reflectance ratio to the background, wherein the imaging unit captures reflected light reflected by the reference plate as a surface image and includes a control unit that determines a type of the recording medium based on the surface image of the reference plate and the surface image of the recording medium.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 12 is a flowchart illustrating determination of a type of a recording medium according to the second exemplary embodiment.

DESCRIPTION OF THE EMBODIMENTS

Various exemplary embodiments, features, and aspects of the invention will be described in detail below with reference to the drawings.

Not all the combinations of the features described in embodiments below are required of a means of solution of the invention.

Figure 1:
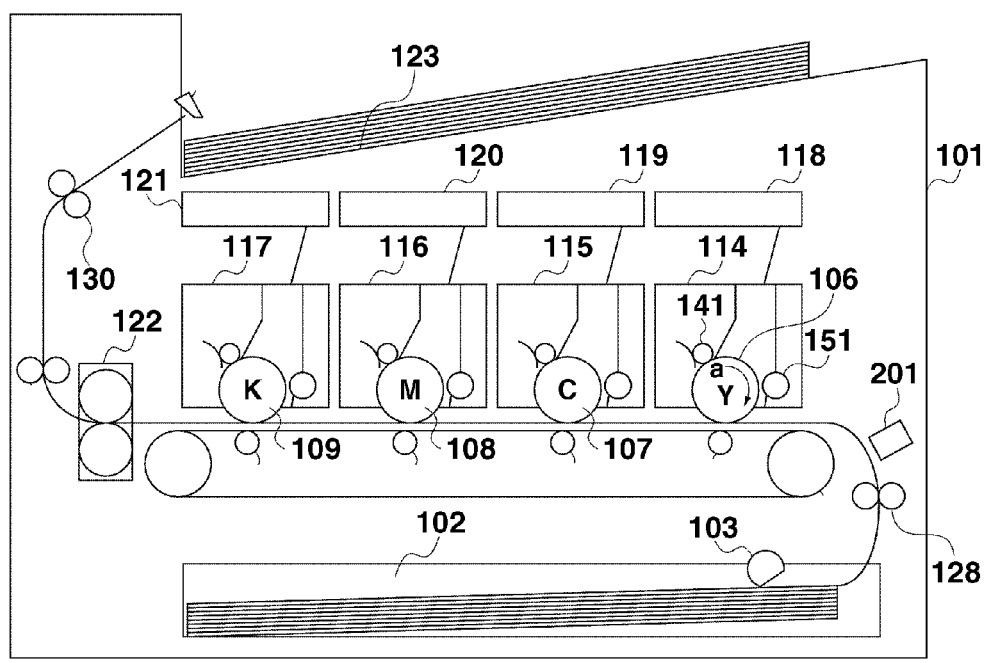
FIG. 1 is a general sectional diagram illustrating a schematic configuration of an image forming apparatus according to an exemplary embodiment of the present invention.

A recording medium imaging apparatus that determines a type of a recording medium according to the present invention can be used in relation to a copying machine, an image forming apparatus or the like. FIG. 1 illustrates an example of a schematic configuration of an image forming apparatus which mounts a recording medium imaging apparatus as an example thereof according to an exemplary embodiment of the present invention.

Image forming processing of an image forming apparatus 101 will be described below. Print data including a print command, image information, and the like are input to the image forming apparatus 101 from a host computer (not illustrated). Then, the image forming apparatus 101 starts a printing operation and a recording medium is conveyed to a conveyance path from a sheet cassette 102 by a sheet feeding roller 103. In an image forming operation, a predetermined potential is applied to photosensitive drums 106, 107, 108, and 109 by a charging roller.

Optical units 118, 119, 120, and 121 form an electrostatic latent image by exposure and scanning of respective surfaces of the charged photosensitive drums 106, 107, 108, and 109 by a laser beam according to the input print data. Developing is executed by cartridges 114, 115, 116, and 117 to visualize the formed electrostatic latent images. The electrostatic latent images formed on the surfaces of the photosensitive drums 106, 107, 108, and 109 are developed as an image using respective colors of developer supplied from the cartridges 114, 115, 116, and 117. Each developed image is transferred onto a recording medium.

The image transferred onto the recording medium 210 is fixed by a fixing unit 122 configured by a fixing roller and the like. The fixed recording medium 210 is discharged to a sheet discharge tray 123 by a sheet discharge roller 130, and the image forming operation is finished.

Figure 2:
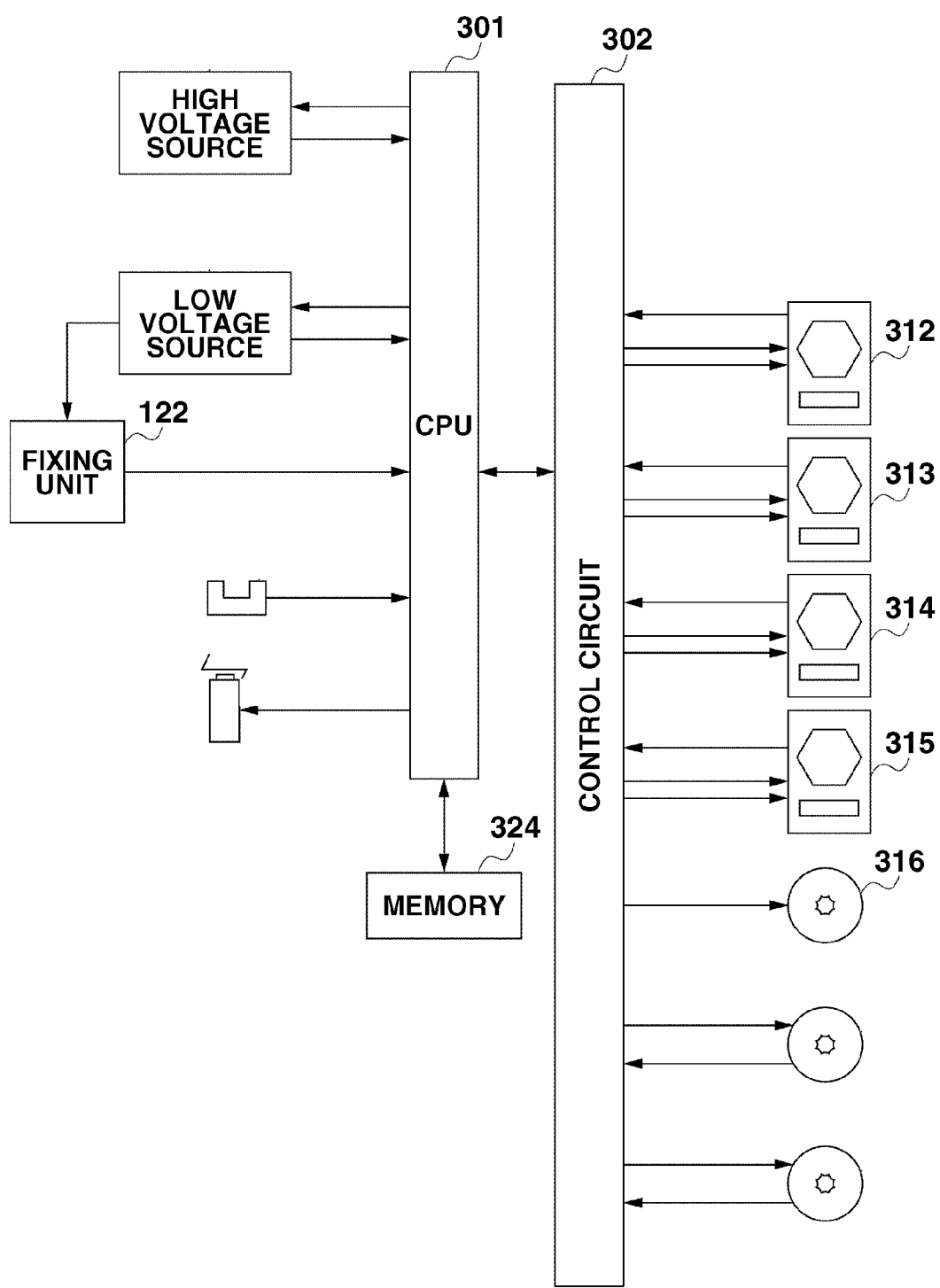
FIG. 2 is a block diagram illustrating operational control of the image forming apparatus.

FIG. 2 is an example of a block diagram illustrating operational control of the image forming apparatus 101. A central processing unit (CPU) 301 is connected via a control circuit 302 to optical units 312 to 315 for respective colors that include a polygonal mirror, a motor, a laser light emitting element, and the like. Control of the optical units 312 to 315 is performed by input of a control signal to the control circuit 302 in order to form a latent image by scanning of the laser onto the photosensitive drums 106 to 109.

In the same manner, the CPU 301 controls a paper supply motor 316 and the like to drive the sheet feeding roller 103 and the conveyance roller 128 to convey the recording medium 210. The CPU 301 monitors a temperature with a thermistor (not illustrated) provided in the fixing unit 122 to maintain a fixing temperature at constant value. The CPU 301 is connected to a memory 324 via a bus or the like (not illustrated) and executes operational control using data and a program stored in the memory 324.

The control circuit 302 executes speed control of the paper supply motor 316 and internal motor speed control of the optical units 312 to 315 based on a command from the CPU 301. A load on the CPU 301 can be reduced by a configuration of a control unit in a circuit of hardware such as the control circuit 302.

Figure 3:
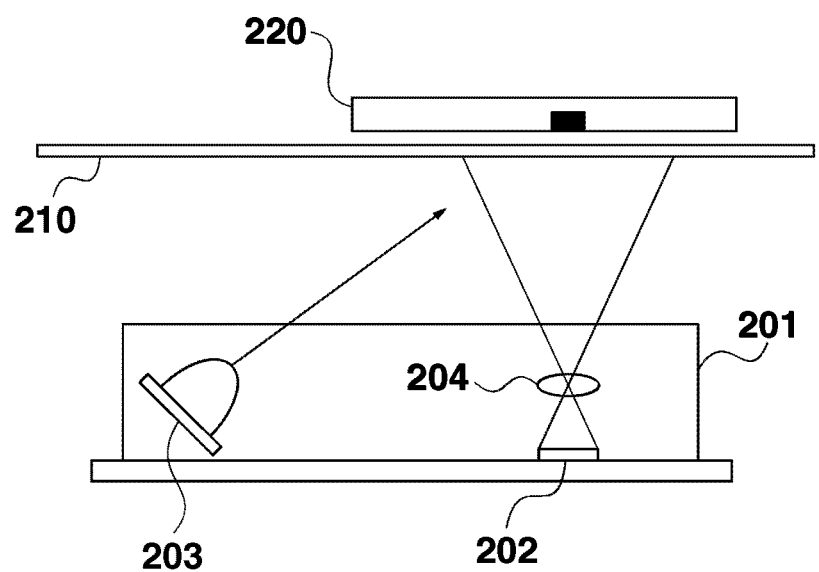
FIG. 3 is a general sectional diagram illustrating a schematic configuration of a recording medium imaging apparatus.

FIG. 3 is a general sectional diagram illustrating a schematic configuration of a recording medium imaging apparatus configured to capture a surface image of the recording medium 210. An image reading sensor 201 includes a CMOS area sensor 202, a light-emitting diode (LED) 203 that emits light at a predetermined angle onto the recording medium 210, and a lens 204. Reflected light from the recording medium 210 is condensed via the lens 204 and forms an image onto the CMOS area sensor 202. In this manner, a surface image of the recording medium 210 can be captured. A correction reference plate 220 is disposed within a range can be illuminated by the LED 203, within a range can be imaged by the image reading sensor 201, and at a position facing the image reading sensor 201 across the recording medium 210.

There is no limitation to use a CMOS area sensor 202, and a charge-coupled device (CCD) sensor or the like may be used. Although the LED 203 in the present exemplary embodiment is disposed at an angle of 10 degrees, there is no particular limitation in this regard, and the LED 203 may be disposed at an optimal angle. The lens 204 may include a Selfoc lens or the like.

Figure 4:
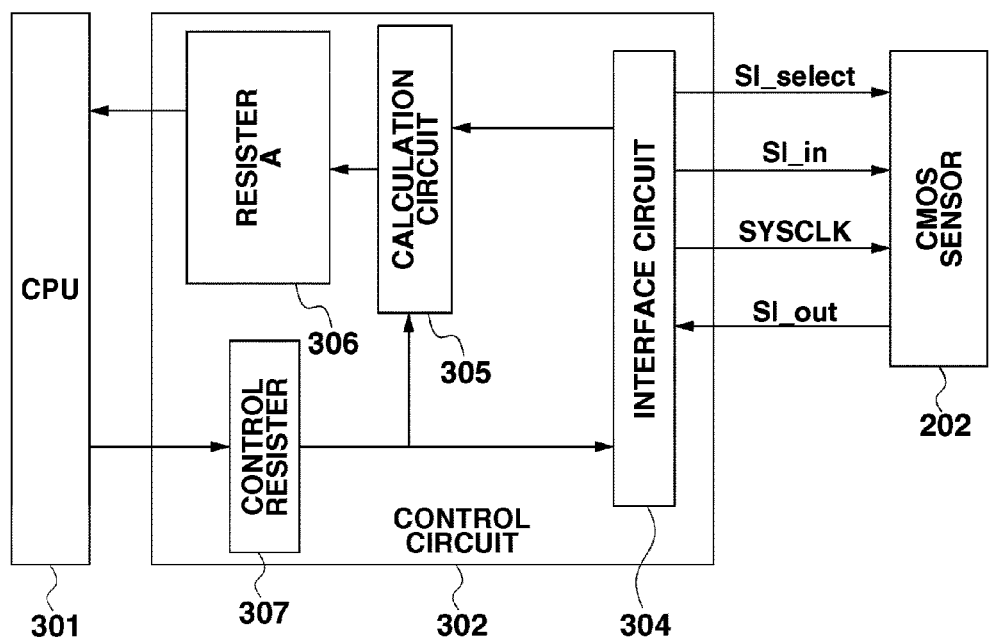
FIG. 4 is a block diagram illustrating operational control of a CMOS area sensor.

Next, a control circuit for the CMOS area sensor 202 will be described with reference to a block diagram illustrated in FIG. 4. FIG. 4 illustrates a CPU 301, a control circuit 302, an interface circuit 304, a calculation circuit 305, a resistor A 306 to which a calculation result is set, and a control resistor 307. An operation of each unit will be described below. When the CPU 301 issues an operational command for the CMOS area sensor 202 to the control resistor 307, image capture of a surface image of the recording medium 210 is started by the CMOS area sensor 202. In other words, accumulation of charge in the CMOS area sensor 202 is started.

When the CMOS area sensor 202 is selected according to an S1_select signal from the interface circuit 304 and a SYSCLK signal is generated at a predetermined timing, a surface image is captured by the CMOS area sensor 202. Thereafter, the captured surface image is transmitted by an S1_out signal. The surface image received via the interface circuit 304 is calculated by the control circuit 302 based on a Formula (1) below.

A calculation result is set in the resistor A 306 as a feature amount of the recording medium 210. The CPU 301 determines the type of the recording medium 210 from a value in the resistor A. Since the CPU 301 needs to execute real time processing, such as sampling processing, and gain and calculation processing of the surface image transferred from the CMOS area sensor 202, it is desirable for the CPU 301 to include a digital signal processor.

FIGS. 5A to 5F illustrate surface images of the recording medium 210 read by the CMOS area sensor 202 of the image reading sensor 201 and images in which an output from the CMOS area sensor 202 has been digitalized into 8×8 pixels. Digitalizing processing is executed by converting an analog output from the CMOS area sensor 202 into 8 bit pixel data using analog-to-digital (A/D) conversion (not illustrated).

Figure 5C:
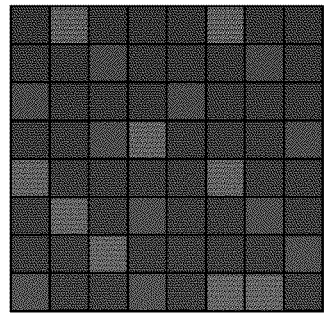
FIGS. 5A to 5F illustrate a surface image of a recording medium captured by the CMOS area sensor.
Figure 5B:
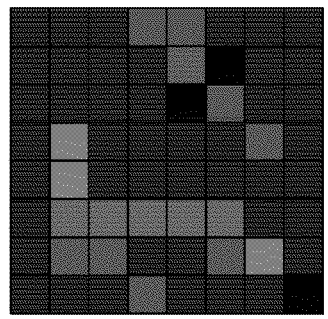
Figure 5A:
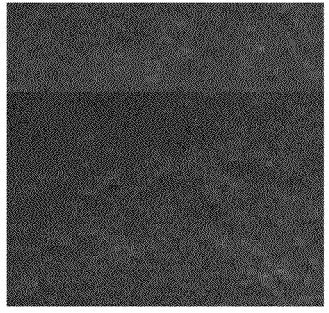
Figure 5F:
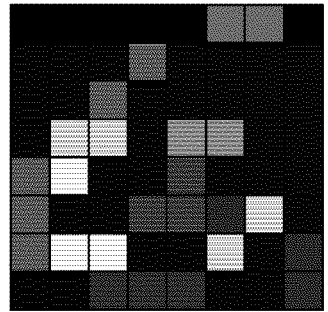
Figure 5E:
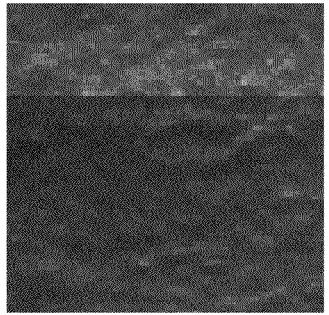
Figure 5D:
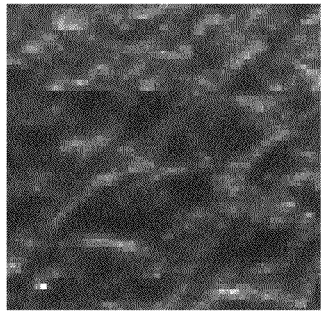

FIG. 5A illustrates a surface image of rough paper in which surface property is comparatively rough and irregularities can be easily determined. FIG. 5B illustrates a surface image of plain paper. FIG. 5C illustrates a surface image of glossy paper in which fibers are compressed. The surface images in FIG. 5A to FIG. 5C read by the CMOS area sensor 202 correspond to the digitalized surface images in FIG. 5D to FIG. 5F, respectively. As seen in FIGS. 5A to 5F, the surface image differs according to the type of the recording medium 210. The difference is mainly due to difference in a state of fibers in the surface of the paper.

In this manner, a light reflection amount of the recording medium 210 can be detected from a total or an average value for the light amount input into each pixel from the digitally processed surface image. However, the reflected light amount may be taken to be the light amount in one pixel rather than calculating the total amount or average amount.

Brightness Dmax of a pixel having maximum brightness and brightness Dmin of a pixel having minimum brightness are acquired from the digitally processed surface image with respect to one line in a direction orthogonal to a conveyance direction of the recording medium 210. A recording medium feature amount Ps can be calculated by detecting Dmax and Dmin from each line, calculating Dmax to Dmin for each line and then adding the calculation results.

[Formula 1]

$$Ps = \sum_{x=1}^{m} (D\max(x) - D\min(x)) \quad (1)$$

Wherein Dmax (x) is the maximum value for brightness in an x line, Dmin (x) is a minimum value for brightness in the x line, and m is the total line number in the surface image.

When the surface property is rough as illustrated in FIG. 5A and therefore irregularities can be easily determined, since the difference between a bright pixel and a dark pixel increases, the feature amount Ps increases. Conversely, when the surface property is smooth as illustrated in FIG. 5C, since the difference between a bright pixel and a dark pixel decreases, the feature amount Ps decreases. The surface property of the recording medium 210 is determined by comparing the feature amount Ps obtained in the above manner with the threshold value used for determination.

The CPU 301 acquires the feature amount Ps for the surface on the recording medium 210 calculated by the calculation circuit 305 from the resistor A 306 and determines the type of the recording medium 210 based on threshold values R1 to R3 used for determination. The threshold values R1 to R3 used for determination are as follows.

$$Ps < R1 \quad (2)$$

$$R1 \leq Ps < R2 \quad (3)$$

$$R2 \leq Ps \leq R3 \quad (4)$$

$$R3 \leq Ps \quad (5)$$

When the value falls within Formula (2), the recording medium 210 is determined as a glossy film. When the value falls within Formula (3), the recording medium 210 is determined as glossy paper. When the value falls within Formula (4), the recording medium 210 is determined as plain paper. When the value falls within Formula (5), the recording medium 210 is determined as rough paper. The values R1, R2, and R3 are constants, and exhibit a relationship such that R1<R2<R3.

In the present exemplary embodiment, the threshold values for determination of the type of the recording medium 210 are determined using the following method. The image reading sensor 201 may include deviations such as deviations in the resolution of the lens 204, and mounting deviations of the lens 204 and the CMOS area sensor 202, or slight errors in the apparatus. These deviations in the image reading sensor 201 may cause an out-of-focus image. When the image is out of focus, there is a possibility that the same feature amount cannot be obtained even when the same object is measured. therefore, the conventional techniques correct the deviation using a reference sheet.

The present exemplary embodiment reduces an influence of the deviation by imaging the correction reference plate 220 and acquiring a reference plate feature amount Cs and threshold values R1 to R3 before determining the type of the recording medium 210.

Figure 6A:
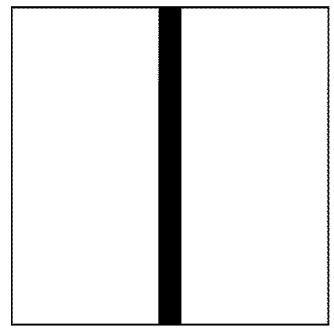
FIGS. 6A and 6B illustrate a surface of a correction reference plate.
Figure 6B:
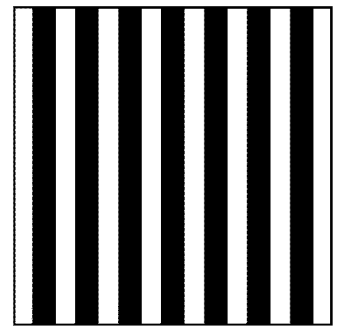

FIG. 6A illustrates an example of a surface of the correction reference plate 220. Herein, a background is white and a discrimination mark is configured by a black line. In the present exemplary embodiment, although the discrimination mark on the correction reference plate 220 is a single black line as illustrated in FIG. 6A, the discrimination mark may be configured by a plurality of black lines as illustrated in FIG. 6B, or may be configured by another color, for example red or the like.

As long as the discrimination mark has a different reflectance ratio from the background, the color or shape thereof is not limited to the examples given herein. Further, the background is not limited to white, and as long as the background has a different reflectance ratio to the discrimination mark, a background of a different color may be used.

Figure 7A:
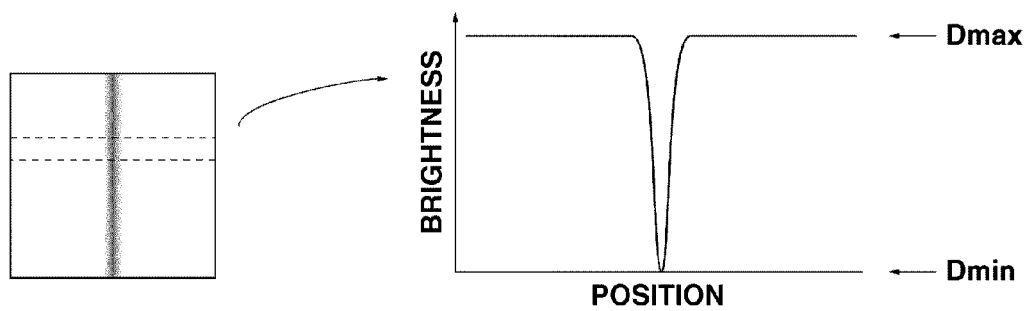
FIGS. 7A to 7C are graphs illustrating brightness and an image of the correction reference plate.
Figure 7B:
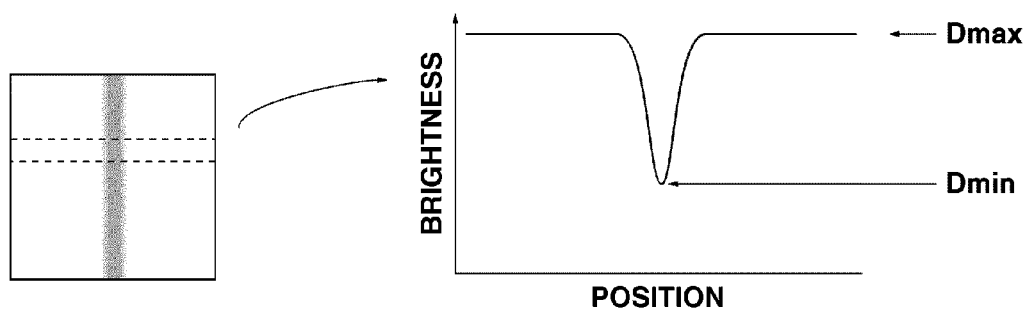
Figure 7C:
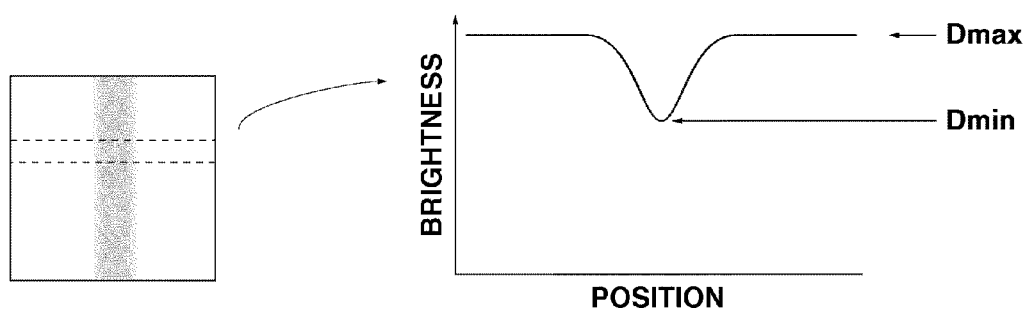

Next, an image of the correction reference plate 220 captured by the image reading sensor 201 will be described with reference to FIG. 7A to 7C. FIGS. 7A to 7C are graphs extracting one line in the surface image of the correction reference plate 220. FIG. 7A illustrates an in-focus state on the correction reference plate 220. FIGS. 7B and 7C illustrate an out-of-focus state. From a graph in FIG. 7A, it can be understood that brightness on the black line portion on the surface image is reduced since the correction reference plate 220 is in focus. In FIGS. 7B and 7C, the brightness reduction on the black line portion of the surface image is less than that illustrated in FIG. 7A since the correction reference plate 220 is not in focus. Therefore, the reference plate feature amount Cs calculated using Formula (1) is smaller when compared to that of FIG. 7A.

Since there is a proportional relationship between the reference plate feature amount Cs and the recording medium feature amount Ps, the threshold values R1 to R3 can be calculated using the reference plate feature amount Cs.

$$R1 = k1 * Cs \quad (6)$$

$$R2 = k2 * Cs \quad (7)$$

$$R3 = k3 * Cs \quad (8)$$

Wherein values k1, k2, and k3 are constants, and exhibit a relationship of k1<k2<k3. In this manner, the influence of the deviation in the mounting accuracy of the image reading sensor 201 or the like can be reduced and determination of the type of the recording medium 210 can be accurately executed by using the reference plate feature amount Cs as the determination threshold value for the type of the recording medium 210.

Figure 8:
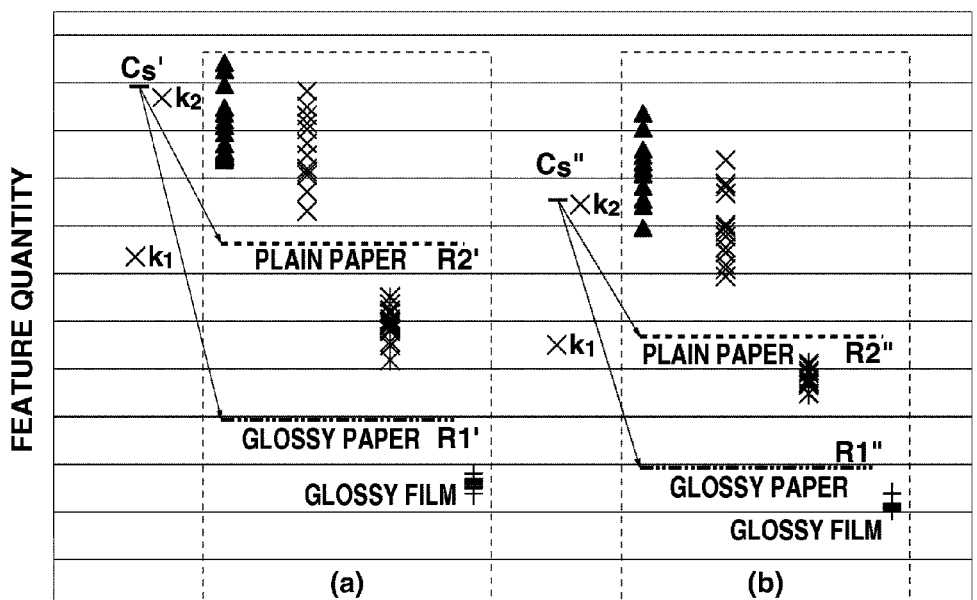
FIG. 8 illustrates a relationship between a reference plate feature amount and a recording medium feature amount.

FIG. 8 illustrates the relationship between the reference plate feature amount Cs and the recording medium feature amount Ps according to a difference in the image reading sensor 201. In FIG. 8, a part (a) illustrates a state in which the reading sensitivity of the image reading sensor 201 is not deteriorated, and a part (b) illustrates a state in which the image reading sensor 201 is deteriorated and the reading sensitivity is reduced. In the part (a), the type of the recording medium 210 is determined using the threshold values R1' and R2' that are used in determination set using the reference plate feature amount Cs'. In the part (b), the type of the recording medium 210 is also determined using the threshold values R1" and R2" that are used in determination set using the reference plate feature amount Cs". In this manner, accurate determination of the type of the recording medium 210 is enabled since a suitable threshold value can be determined using the reference plate feature amount Cs according to the state of the image reading sensor 201.

Thus, if the type of the recording medium 210 is determined, then the CPU 301 sets optimal image forming conditions for the determined recording medium 210. An example of control for image forming conditions executed by the CPU 301 is described below.

When the type of the recording medium 210 is glossy paper, the CPU 301 performs control to change a tint of the color by correcting (for example, gamma correction or the like) image information. This correction is due to the fact that when a printing operation is executed using glossy paper, it is desirable to increase a contrast of the recording medium 210 in comparison to when using plain paper or the like. Further, fixing property of the toner attaching to the surface of the recording medium 210 can be improved by reducing a conveyance speed of the recording medium 210 or increasing a temperature of the fixing unit 122, accordingly the gloss can be increased and an image quality can be improved.

When the recording medium 210 is rough paper, control is executed to reduce a developing bias to less than that used for plain paper, suppress the toner amount attached to the surface of the recording medium 210 and prevent the toner from scattering. In particular when using the rough paper, such a control operation is executed to eliminates a problem associated with deterioration of the image quality due to toner scattering since a large amount of the toner attaches to the surface of the recording medium 210.

Figure 9:
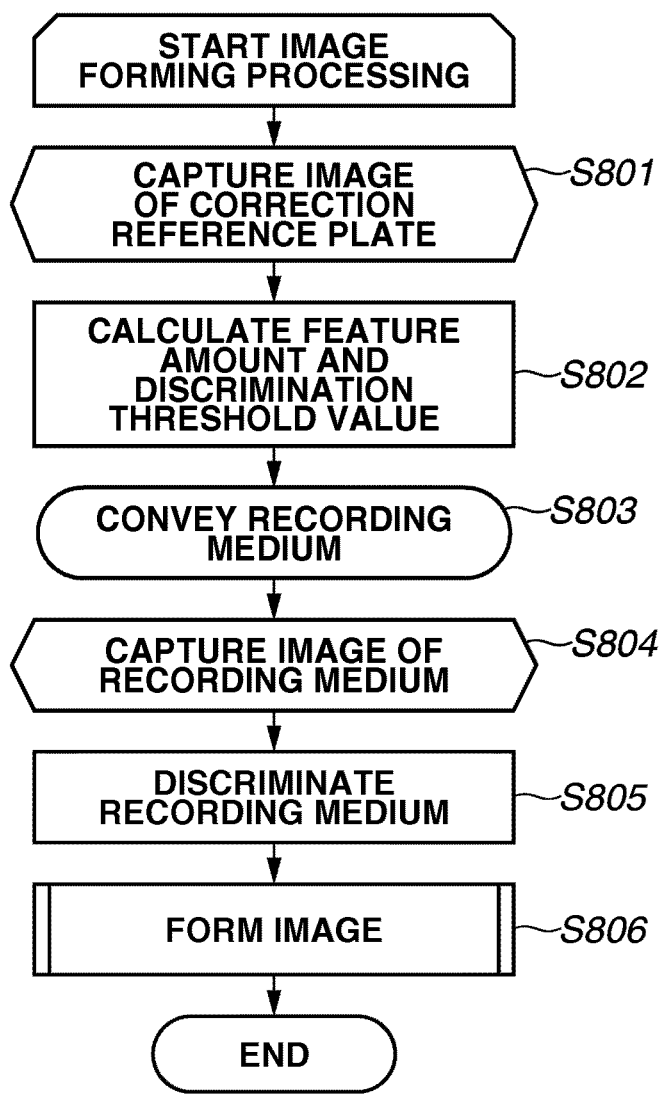
FIG. 9 is a flowchart illustrating determination of a type of a recording medium.

Next, a flow from determination of the type of the recording medium 210 to image forming will be described using a flowchart illustrated in FIG. 9. When the image forming processing is started, in step 5801, before conveying the recording medium 210, a surface image of the correction reference plate 220 is captured using the image reading sensor 201. Then in step S802, threshold values R1 to R3 for determination and the surface image feature amount Cs are calculated from the obtained surface image for the correction reference plate 220.

In step S803, conveyance of the recording medium 210 is started. In step S804, when the recording medium 210 has been conveyed to an imaging range of the image reading sensor 201, a surface image of the recording medium 210 is captured. In step S805, a recording medium feature amount Ps is calculated from the obtained surface image of the recording medium 210, and the type of the recording medium 210 is determined by comparing the calculated recording medium feature amount Ps with the threshold values for the determination. Then in step S806, the conditions for image forming are set and image forming is executed according to the determined type of the recording medium 210.

As described above, a feature amount Cs of the correction reference plate 220 can be acquired before conveying the recording medium 210 and the threshold values R1 to R3 for determining the type of the recording medium 210 can be determined from the feature amount Cs of the correction reference plate 220. Thereafter, the recording medium 210 is conveyed, and a surface image of the recording medium 210 is captured to acquire a feature amount Ps of the recording medium 210 from the surface image.

The type of the recording medium 210 can be determined by a comparison of the threshold values for the determination with the feature amount Ps of the recording medium 210. Thus, even when the conditions related to the mounting accuracy of the image reading sensor 201 or the like are different, use of the feature amount Cs of the correction reference plate 220, the threshold values R1 to R3 for determination, and the feature amount Ps for the recording medium 210 enables accurate determination of the type of the recording medium 210.

Although the description to this point has been described execution of determination of a recording medium by reducing a threshold value, the present invention is not limited in that regard. For example, a recording medium can be determined by using a threshold value without variation and correcting the feature amount of the recording medium based on the feature amount of the correction reference plate 220. In this case, the calculation of the feature amount of the recording medium is executed by multiplication of an inverse of the constant k used when calculating the threshold values.

Here, a second exemplary embodiment is described below. Since a configuration of the second exemplary embodiment can be implemented by that illustrated in FIGS. 1 to 4 according to the first exemplary embodiment, description will not be repeated. In the present exemplary embodiment, a discrimination mark is formed on the correction reference plate 220 in vertical and horizontal directions to calculate the feature amount in the vertical and horizontal direction.

Figure 10A:
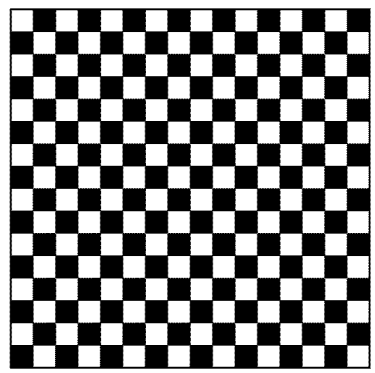
FIGS. 10A and 10B illustrate a discrimination mark for a correction reference plate according to a second exemplary embodiment of the present invention.
Figure 10B:
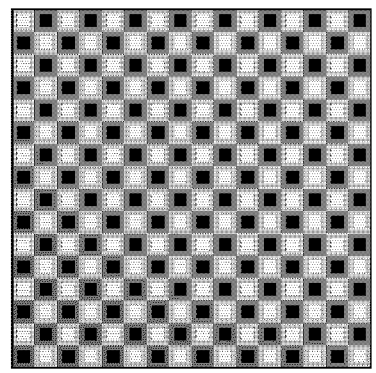

FIGS. 10A and 10B illustrate the correction reference plate 220 according the present exemplary embodiment. FIG. 10A illustrates the correction reference plate 220, and FIG. 10B is a digital image of the surface image of the correction reference plate 220. The correction reference plate 220 arranges two different types of squares having different colors to configure a discrimination mark. Use of this discrimination mark enables acquisition of feature amounts in both the conveyance direction and a direction vertical to the conveyance direction of the recording medium 210.

The reference plate feature amount Cs obtained when scanning the horizontal direction in FIG. 10B is a feature amount calculated from a contrast difference between the maximum brightness and the minimum brightness in one line, so that it can obtain the same result as the reference plate feature amount Cs described in the first exemplary embodiment. In the present exemplary embodiment, the reference plate feature amount Cs can be calculated by scanning not only in the horizontal direction but also in the vertical direction. The recording medium feature amount Cs2 in which the recording medium feature amount Cs expanded in two dimensions can be calculated from the formula below.

[Formula 2]

$$Cs2 = \sum_{x=1}^{m}(D1\max(x) - D1\min(x)) + \sum_{y=1}^{n}(D2\max(y) - D2\min(y)) \quad (9)$$

Wherein, D1max (x) and D1min (x) denote the maximum value and the minimum value of the brightness in a horizontal x line, D2max (y) and D2 min (y) denote the maximum value and the minimum value of the brightness in a horizontal y line, m denotes the total line number in the horizontal direction of the surface image, and n denotes the total line number in the vertical direction of the surface image.

As described above, in the present embodiment, the reference plate feature amount can be expanded in two dimensions and calculated by forming the discrimination mark of the correction reference plate 220 in the vertical and horizontal directions and executing the calculation of the reference plate feature amount Cs2 in the vertical and horizontal directions. Accordingly, the reference plate feature amount Cs2 can be more accurately calculated, and determination of the type of the recording medium 210 can be performed more accurately.

Although an example of a discrimination mark is described herein that arranges different squares alternately, the invention is not limited to this configuration. A pattern formed by crossing straight vertical and horizontal lines or a pattern formed by crossing inclined straight lines can also be used to obtain a two-dimensional feature amount.

Here, a third exemplary embodiment is described below. Since a configuration of the third exemplary embodiment can be implemented by that illustrated in FIGS. 1, 2, and 4 according to the first exemplary embodiment, description will not be repeated. In the present exemplary embodiment, a type of the recording medium 210 is determined not only by capturing a surface image using reflected light from the recording medium 210 but also by imaging using transmitted light from the recording medium 210.

Figure 11:
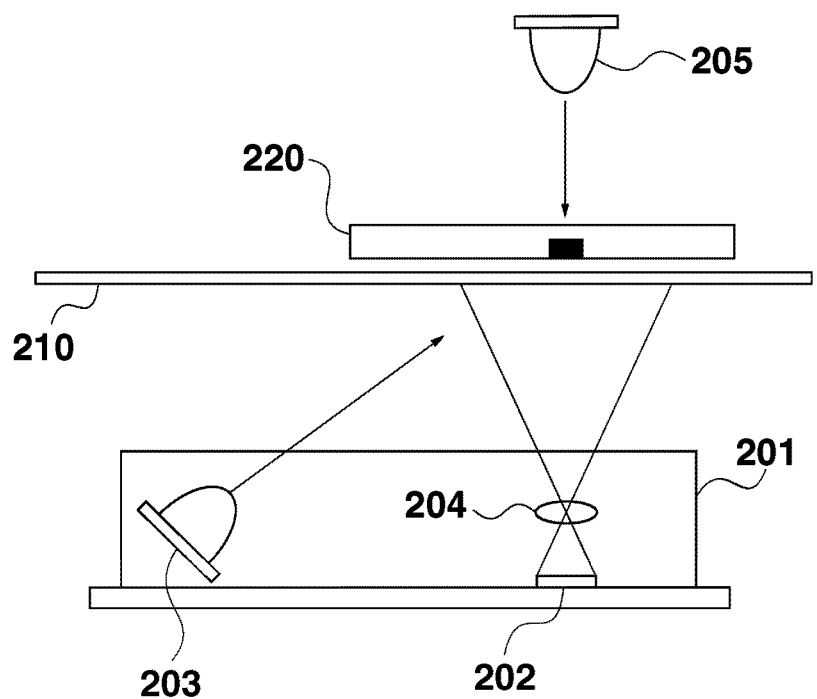
FIG. 11 is a general sectional diagram illustrating a schematic configuration of a recording medium imaging apparatus according to the second exemplary embodiment.

FIG. 11 is a general sectional diagram illustrating a schematic configuration of a recording medium imaging apparatus that captures a surface image of the recording medium 210 according to the present exemplary embodiment. An LED 205 is disposed on a position facing the image reading sensor 201 across the correction reference plate 220 and an image of light transmitted through the correction reference plate 220 is captured by the image reading sensor 201. Use of a translucent white synthetic resin such as a polyacetal (POM) resin is desirable since the correction reference plate 220 requires physical characteristics in which light from the LED 203 is reflected and the light from the LED 205 is transmitted.

Next, a method for measuring the light transmitted through the recording medium 210 will be described. The LED 205 is switched on prior to conveyance of the recording medium 210 and the light pas sing through the correction reference plate 220 is captured by the image reading sensor 201. A transmitted light amount 806 in a state in which there is no recording medium 210 is obtained from a total or an average value of the light amount input to each pixel. Then the recording medium 210 is conveyed, and the light passing through the recording medium 210 is captured by the image reading sensor 201. A transmitted light amount 805 in a state in which there is the recording medium 210 is obtained from the total or the average value of the light amount input to each pixel. A light transmissivity F is calculated using these two transmitted light amounts.

Light transmissivity $F$=transmitted light amount 805/
transmitted light amount 806     (10)

The type of the recording medium 210 is determined based on the light transmissivity F calculated from Formula (10) and the threshold values R4 and R5 for determination. The threshold values R4 and R5 for determination are calculated according to the light transmissivity F.

$F<R4$     (11)

$R4 \leq F \leq R5$     (12)

$R5<F$     (13)

When the value falls within Formula (11), the recording medium 210 is determined as thick paper. When the value falls within Formula (12), the recording medium 210 is determined as plain paper. When the value falls within Formula (13), the recording medium 210 is determined as thin paper. The values R4 and R5 are predetermined constants and exhibit a relationship R4<R5. The threshold values R4 and R5 can be calculated from the reference plate feature amount.

$R4=k4*Cs$     (14)

$R5=k5*Cs$     (15)

Wherein k4 and k5 are constants and exhibit a relationship such that k4<k5.

Thus, if the type of the recording medium 210 is determined, then the CPU 301 sets optimal image forming conditions for the determined recording medium 210. An example of control for image forming conditions executed by the CPU 301 is described below.

The CPU 301 executes control to change the fixing temperature of the fixing unit in response to the type of the supplied recording medium 210. When using thick paper which is thicker than plain paper, there is a problem. More specifically, a heat capacity of the thick paper is larger than that of the plain paper, so that if the toner is fixed to the thick paper at the same fixing temperature as that used for the plain paper, the same fixing characteristics cannot be obtained. Consequently, when the recording medium 210 is determined as the thick paper, the CPU 301 executes control to maintain the fixing characteristics of the toner onto the thick paper by using the fixing temperature higher than that for the plain paper.

Further, the CPU 301 determines the type of supplied recording medium 210 and may execute control to change the conveyance speed according to the determination result. When the type of the recording medium 210 is the thick paper thicker than the plain paper, there is a problem. More specifically, the heat capacity of the thick paper is larger than that of the plain paper, so that if the toner is fixed to the thick paper at the same conveyance speed as that used for the plain paper, the same fixing characteristics cannot be obtained. Consequently, when the recording medium 210 is determined as the thick paper, the CPU 301 sets the conveyance speed of the recording medium 210 to be slower than that of when supplying the plain paper to increase the heat amount supplied to the thick paper per unit time.

When the type of the recording medium 210 is overhead transparency (OHT), the conveyance speed of the recording medium 210 is set to be slower than that of the plain paper, and the fixing temperature is increased to improve the fixing characteristics.

Next, a flow from determination of the type of the recording medium 210 to image forming will be described with reference to a flowchart in FIG. 12. When the image forming processing is started, in step S1101, before conveying the recording medium 210, the correction reference plate 220 is irradiated with light from the LED 205, and a surface image of the correction reference plate 220 is captured using the image reading sensor 201. The light amount of the LED 205 is detected from the total or the average value of the light amount input to each pixel and an electric current applied to the LED 205 is regulated so that the light amount is maintained at a constant value.

Then in step S1102, irradiation from the LED 205 is stopped. Whereas irradiation from the LED 203 is started and the surface image of the correction reference plate 220 is captured using the image reading sensor 201. In step 1103, the reference plate feature amount Cs and the threshold values R1 and R3 for determination are calculated from the obtained surface image.

In step S1104, conveyance of the recording medium 210 is started. In step S1105, irradiation from the LED 203 is stopped, whereas irradiation from the LED 205 is started. Further, the surface image of the correction reference plate 220 is captured using the image reading sensor 201 and the transmitted light amount is measured. In step S1106, it is determined whether the recording medium 210 is an OHT by whether the transmitted light amount calculated in step S1105 is greater than or equal to a predetermined value. When the transmitted light amount is greater than or equal to a predetermined value, the recording medium 210 is determined as the OHT.

In step S1106, when it is determined that the recording medium 210 is other than the OHT (NO in steep S1106), the processing proceeds to step S1107. In step S1107, the irradiation from the LED 205 is stopped, while the irradiation from the LED 203 is started and in step S1107, and the surface image of the correction reference plate 220 is captured using the image reading sensor 201. In step S1108, the recording medium feature amount Ps is calculated from the obtained surface image and compared with the threshold values R4 and R5 for determination to determine the recording medium 210. In step S1109, image formation is executed by setting image forming conditions according to the determined type of the recording medium 210.

In step S1106, when the recording medium 210 is determined as the OHT (YES in step S1106), the processing proceeds to step S1110. In step S1110, image forming is executed by setting optimal image forming conditions for the OHT without capturing the reflected light from irradiation by the LED 203.

In this manner, the type of the recording medium 210 can be determined in a more detailed manner by a configuration in which the LED 205 is disposed on a position facing the image reading sensor 201 across the correction reference plate 220 so that light passes through the correction reference plate 220.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-232726 filed Oct. 6, 2009, which is hereby incorporated by reference herein in its entirety.

What is claimed is:

1. A recording medium imaging apparatus comprising:
an irradiation unit configured to irradiate a recording medium with light;
an imaging unit configured to capture reflected light which is irradiated by the irradiation unit and reflected by the recording medium as an image; and
a reference plate which includes a background that reflects light irradiated by the irradiation unit, and a mark that has a different reflectance ratio to the background,
wherein the imaging unit captures reflected light reflected by the reference plate as an image,
a control unit configured to determine a type of the recording medium based on the image of the reference plate and the image of the recording medium.

2. The recording medium imaging apparatus according to claim 1, wherein the control unit detects brightness of each pixel from the image of the reference plate and calculates a threshold value to determine the recording medium from maximum value and minimum value of the brightness.

3. The recording medium imaging apparatus according to claim 1, wherein the mark is formed in a direction vertical to a conveyance direction of the recording medium.

4. The recording medium imaging apparatus according to claim 1, wherein the mark is formed in a direction parallel to a conveyance direction of the recording medium.

5. The recording medium imaging apparatus according to claim 1, wherein the background and the mark are arranged alternately on the reference plate.

6. A recording medium imaging apparatus comprising:
an irradiation unit configured to irradiate a recording medium with light;
an imaging unit configured to capture transmitted light which is irradiated by the irradiation unit and transmitted through the recording medium as an image; and
a reference plate which includes a background that can transmit light irradiated by the irradiation unit and a mark that has a different transmissivity to the background,
wherein the imaging unit captures transmitted light transmitted through the reference plate as an image,
a control unit configured to determine a type of the recording medium based on the image of the reference plate and the image of the recording medium.

7. The recording medium imaging apparatus according to claim 6, wherein the control unit detects brightness of each pixel from the image of the reference plate and calculates a threshold value to determine the recording medium from maximum value and minimum value of the brightness.

8. The recording medium imaging apparatus according to claim 6, the mark is formed in a direction vertical to a conveyance direction of the recording medium.

9. The recording medium imaging apparatus according to claim 6, wherein the mark is formed in a direction parallel to a conveyance direction of the recording medium.

10. The recording medium imaging apparatus according to claim 6, wherein the background and the mark are arranged alternately on the reference plate.

* * * * *